US012393339B2

(12) United States Patent
Yang et al.

(10) Patent No.: US 12,393,339 B2
(45) Date of Patent: Aug. 19, 2025

(54) DATA I/O PROCESSING METHOD AND APPARATUS, STORAGE MEDIUM, AND DEVICE

(71) Applicant: INSPUR SUZHOU INTELLIGENT TECHNOLOGY CO., LTD., Suzhou (CN)

(72) Inventors: Hongjie Yang, Suzhou (CN); Yonggang Hu, Suzhou (CN)

(73) Assignee: INSPUR SUZHOU INTELLIGENT TECHNOLOGY CO., LTD., Suzhou (CN)

( * ) Notice: Subject to any disclaimer, the term of this patent is extended or adjusted under 35 U.S.C. 154(b) by 193 days.

(21) Appl. No.: 18/270,595

(22) PCT Filed: Dec. 30, 2021

(86) PCT No.: PCT/CN2021/143248
§ 371 (c)(1),
(2) Date: Jun. 30, 2023

(87) PCT Pub. No.: WO2022/151989
PCT Pub. Date: Jul. 21, 2022

(65) Prior Publication Data
US 2024/0061581 A1 Feb. 22, 2024

(30) Foreign Application Priority Data
Jan. 14, 2021 (CN) .......................... 202110047891.6

(51) Int. Cl.
*G06F 3/06* (2006.01)
(52) U.S. Cl.
CPC .............. *G06F 3/061* (2013.01); *G06F 3/064* (2013.01); *G06F 3/0673* (2013.01)
(58) Field of Classification Search
None
See application file for complete search history.

(56) References Cited

U.S. PATENT DOCUMENTS

2018/0203640 A1   7/2018  Chen et al.
2022/0077885 A1*  3/2022  Dicks .................... H04W 4/021
2022/0337922 A1* 10/2022  Denoual ............... H04N 19/176

FOREIGN PATENT DOCUMENTS

CN   103984607 A   8/2014
CN   107632780 A   1/2018
(Continued)

OTHER PUBLICATIONS

International Search Report dated Mar. 9, 2022; International Application No. PCT/CN2021/143248.
(Continued)

*Primary Examiner* — Scott C Sun
(74) *Attorney, Agent, or Firm* — Maschoff Brennan

(57) ABSTRACT

A data I/O processing method includes obtaining data requested consisting of a plurality of basic data blocks in sequence; grouping the data in sequence to obtain a plurality of segmented data blocks in sequence; sequentially determining whether each segmented data block has a time delay statistical record based on the time for completion of the operation processing of a previous basic data block; in response to the time delay statistical record being present in the segmented data block, setting a waiting time period according to the time delay statistical record; sequentially merging the basic data blocks, which have not been subjected to the operation processing, in the segmented data blocks within the waiting time period until the waiting time period is ended or the merged basic data blocks reach the size of the segmentation unit, and stopping merging; and sending the merged basic data blocks and performing the operation processing.

16 Claims, 2 Drawing Sheets

(56) References Cited

FOREIGN PATENT DOCUMENTS

| | | |
|---|---|---|
| CN | 107886414 A | 4/2018 |
| CN | 108038171 A | 5/2018 |
| CN | 110727685 A | 1/2020 |
| CN | 111881096 A | 11/2020 |
| CN | 112732197 A | 4/2021 |
| WO | 2014121593 A1 | 8/2014 |
| WO | 2022151989 A1 | 7/2022 |

OTHER PUBLICATIONS

Written Opinion for International Application PCT/CN2021/143248.
Notification to Grant Patent Right dated Jun. 28, 2022; Application No. 202110047891.6.

* cited by examiner

DATA I/O PROCESSING METHOD AND APPARATUS, STORAGE MEDIUM, AND DEVICE

CROSS-REFERENCE TO RELATED APPLICATION

The present application is the U.S. National Stage of PCT/CN2021/143248 filed on Dec. 30, 2021, which claims priority to Chinese patent application No. 202110047891.6, filed to the China National Intellectual Property Administration on Jan. 14, 2021 and entitled "Data I/O Processing Method and Apparatus, Storage Medium and Device", the contents of which are incorporated herein by reference in its entirety.

PRIOR ART

The present application relates to the technical field of data processing, and in particular, to a data I/O processing method and apparatus, a storage medium, and a device.

BACKGROUND OF THE INVENTION

On the basis of continuous enrichment of distributed storage docking scenarios, different service models have different requirements for the performance of products. In a distributed storage system, according to a data discretization algorithm, random data may be distributed to different disks of different nodes for concurrent operations. In a data sequence I/O scenario, since the algorithm has the smallest segmentation unit, when the size of a data block is less than the smallest segmentation unit, continuous data blocks need to operate on a same segmentation unit, that is, a same disk of a corresponding base layer, the concurrent operation is unable to be performed, leading to insufficient utilization of the performance of the system, affecting the user experience. Currently, distributed block storage generally carries resources of a system disk of a guest virtual machine, and system latency is too high, resulting in instability of an operating system, affecting the services of clients. Therefore, accelerating the response speed of the system has important significance for improving the performance of the system, enhancing the stability of the system, and promoting product competitiveness.

SUMMARY OF THE INVENTION

In view of this, an objective of the present application is to provide a data I/O processing method and apparatus, a storage medium, and a device for improving the performance of a distributed block storage system.

On the basis of the above objective, the present application provides a data I/O processing method, including the following steps:
obtaining data which is requested to be subjected to operation processing and consists of a plurality of basic data blocks in sequence;
grouping the data in sequence by taking a preset segmentation unit as a unit to obtain a plurality of segmented data blocks in sequence;
sequentially processing and determining whether each segmented data block has a time delay statistical record that is based on the time for completion of the operation processing of a previous basic data block;
in response to the time delay statistical record being present in the segmented data block, setting a waiting time period according to the time delay statistical record;
sequentially merging the basic data blocks, which have not been subjected to the operation processing, in the segmented data blocks within the waiting time period until the waiting time period is ended or the waiting time period is not ended but the merged basic data blocks reach the size of the segmentation unit, and stopping merging; and
sending the merged basic data blocks and performing the operation processing.

In some embodiments, the step of sequentially processing and determining whether each segmented data block has a time delay statistical record that is based on the time for completion of the operation processing of a previous basic data block includes:
determining whether the first segmented data block has a time delay statistical record that is based on the time for completion of the operation processing of previous several basic data blocks; and
determining whether the nth segmented data block has a time delay statistical record that is based on the time for completion of the operation processing of basic data blocks in the nth segmented data block and/or in previous n−1 segmented data blocks is determined, where n is an integer greater than 1.

In some embodiments, the time delay statistical record is the average time for completion of the operation processing of a plurality of previous basic data blocks.

In some embodiments, the step of sequentially merging the basic data blocks, which have not been subjected to the operation processing, in the segmented data blocks within the waiting time period until the waiting time period is ended or the waiting time period is not ended but the merged basic data blocks reach the size of the segmentation unit, and stopping merging includes:
in a case that the segmented data block is the first segmented data block, sequentially merging the basic data blocks, which have not been subjected to the operation processing, in the first segmented data block within the waiting time period until the waiting time period is ended, and stopping merging; and
in a case that the segmented data block is the nth segmented data block, sequentially merging the basic data blocks, which have not been subjected to the operation processing, in the nth segmented data block within the waiting time period until the waiting time period is ended or the waiting time period is not ended but the merged basic data blocks reach the size of the segmentation unit, and stopping merging, where n is an integer greater than 1.

In some embodiments, the method further includes: in response to the time delay statistical record being not present in the segmented data block, directly sending all of the basic data blocks in the segmented data block, and performing the operation processing.

In some embodiments, the step of sending the merged basic data blocks and performing the operation processing includes: sending the merged basic data blocks to a storage area corresponding to the segmented data block thereof, and performing the operation processing.

In some embodiments, the method further includes:
after obtaining the data which is requested to be subjected to the operation processing, determining whether there is other data, which has the same offset and length as the obtained data, being subjected to the operation processing;

in response to the other data being subjected to the operation processing, putting the obtained data in a blocking queue; and in response to no other data being subjected to the operation processing, advancing to the step of grouping the data in sequence by taking a preset segmentation unit as a unit.

Another aspect of the present application further provides a data I/O processing apparatus, including:

a data acquisition module, configured to obtain data which is requested to be subjected to operation processing and consists of a plurality of basic data blocks in sequence;

a data grouping module, configured to group the data in sequence by taking a preset segmentation unit as a unit to obtain a plurality of segmented data blocks in sequence;

a time delay statistical record determination module, configured to sequentially process and determine whether each segmented data block has a time delay statistical record that is based on the time for completion of the operation processing of a previous basic data block;

a waiting time period setting module, configured to, in response to the time delay statistical record being present in the segmented data block, set a waiting time period according to the time delay statistical record;

a merging module, configured to sequentially merge the basic data blocks, which have not been subjected to the operation processing, in the segmented data blocks within the waiting time period until the waiting time period is ended or the waiting time period is not ended but the merged basic data blocks reach the size of the segmentation unit, and stop merging; and a sending module, configured to send the merged basic data blocks and perform the operation processing.

Still another aspect of the present application further provides a computer-readable storage medium, having computer program instructions stored thereon, where when the computer program instructions are executed, any one of the above methods is implemented.

Yet another aspect of the present application further provides a computer device, including a memory and a processor, where the memory has a computer program stored thereon, and when the computer program is executed by the processor, any one of the above methods is implemented.

The present application at least has the following beneficial technical effects:

according to the present application, by means of collecting a time delay statistical record during data I/O, setting a rational waiting time period according to the time delay statistical record, waiting for a period of time before the data is sent, and merging continuous data during the period, the time for data I/O is effectively shortened, such that the throughput of a storage system is further increased, and the performance of the storage system is greatly improved in a continuous data I/O scenario, thereby improving the user experience.

BRIEF DESCRIPTION OF DRAWINGS

In order to more clearly illustrate the embodiments of the present application or the technical solutions in the prior art, the drawings used in the description of the embodiments or the prior art will be briefly described below. It is apparent that the drawings in the following descriptions are merely some embodiments of the present application. For those of ordinary skill in the art, other embodiments may also be obtained according to these drawings without any creative work.

DETAILED DESCRIPTION OF THE INVENTION

To make the objectives, technical solutions and advantages of the present application clearer, the present application is further described in detail with reference to specific embodiments and the drawings.

It should be noted that, all expressions using "first" and "second" in the embodiments of the present application are for the purpose of distinguishing two non-identical entities or non-identical parameters with a same name. It may be seen that "first" and "second" are only for the convenience of expression, and should not be construed as a limitation to the embodiments of the present application. In addition, the terms "include" and "have" and any variations thereof are intended to cover non-exclusive inclusions, for example, other steps or units inherent in a process, method, system, product, or device that includes a series of steps or units.

Figure 1:
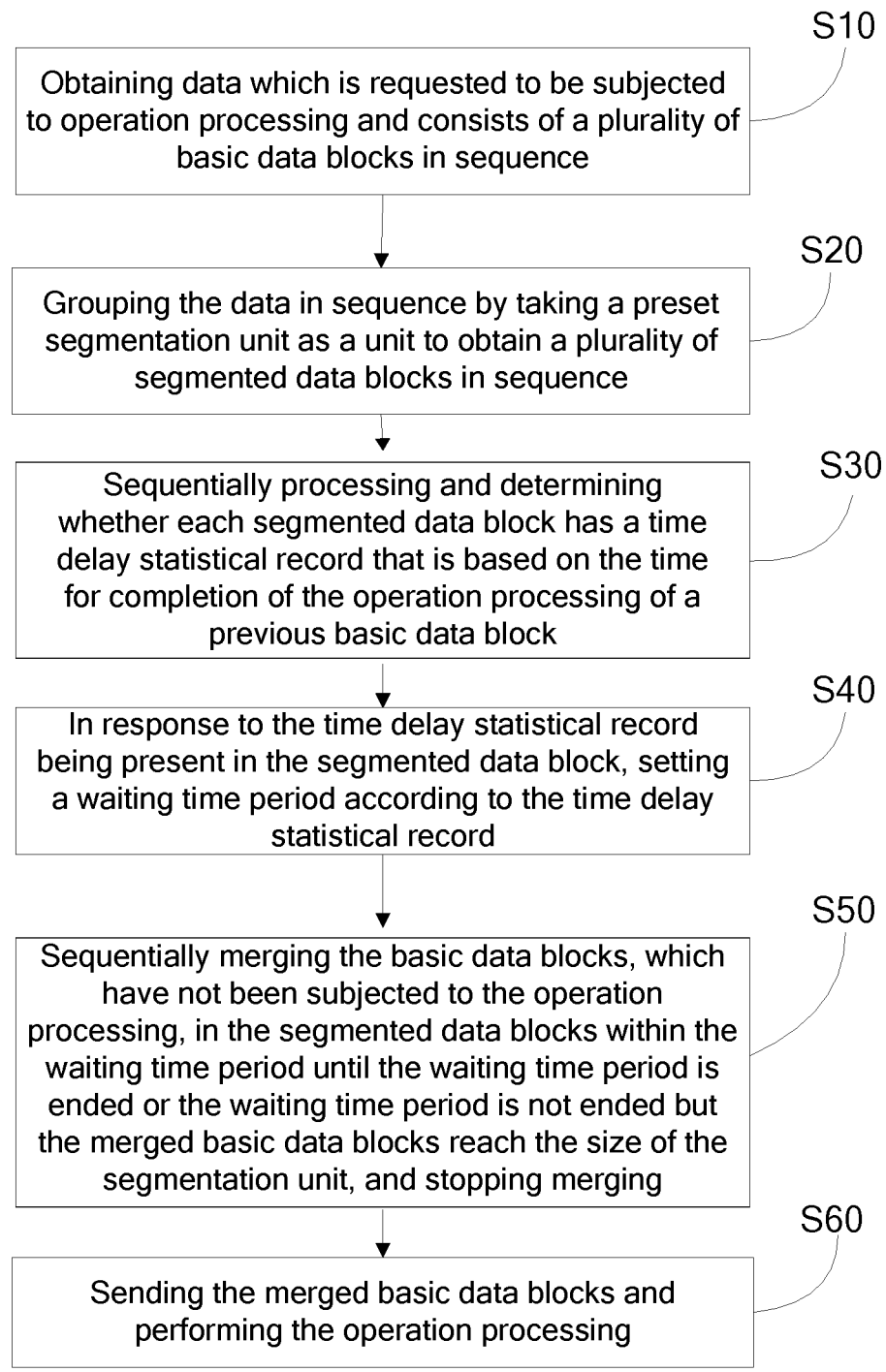
FIG. 1 is a schematic diagram of an embodiment of a data I/O processing method according to the present application.

On the basis of the above objective, a first aspect of an embodiment of the present application provides an embodiment of a data I/O processing method. FIG. 1 shows a schematic diagram of an embodiment of a data I/O processing method according to the present application. As shown in FIG. 1, the embodiment of the present application includes the following steps:

Step S10, obtaining data which is requested to be subjected to operation processing and consists of a plurality of basic data blocks in sequence;

Step S20, grouping the data in sequence by taking a preset segmentation unit as a unit to obtain a plurality of segmented data blocks in sequence;

Step S30, sequentially processing and determining whether each segmented data block has a time delay statistical record that is based on the time for completion of the operation processing of a previous basic data block;

Step S40, in response to the time delay statistical record being present in the segmented data block, setting a waiting time period according to the time delay statistical record;

Step S50, sequentially merging the basic data blocks, which have not been subjected to the operation processing, in the segmented data blocks within the waiting time period until the waiting time period is ended or the waiting time period is not ended but the merged basic data blocks reach the size of the segmentation unit, and stopping merging; and Step S60, sending the merged basic data blocks and performing the operation processing.

In this embodiment, data I/O refers to data input and output.

According to the embodiments of the present application, by means of collecting a time delay statistical record during data I/O, setting a rational waiting time period according to the time delay statistical record, waiting for a period of time before the data is sent, and merging continuous data during the period, the time for data I/O is shortened, such that the throughput of a storage system is further increased, and the performance of the storage system is greatly improved in a continuous data I/O scenario, thereby improving the user experience.

In some embodiments, the step of sequentially processing and determining whether each segmented data block has the time delay statistical record that is based on the time for completion of the operation processing of the previous basic data block includes: determining whether the first segmented data block has a time delay statistical record that is based on the time for completion of the operation processing of previous several basic data blocks; and determining whether the nth segmented data block has a time delay statistical record that is based on the time for completion of the operation processing of basic data blocks in the nth segmented data block and/or in previous n−1 segmented data blocks, where n is an integer greater than 1. In this embodiment, since the basic data blocks in the data which is requested to be subjected to the operation processing are arranged in sequence, all of the basic data blocks are also divided in sequence when being divided into the segmented data blocks, and then the first or previous several basic data blocks may form a first time delay statistical record, that is, the operation processing of the first or previous several basic data blocks is first completed. The time delay statistical record of the nth segmented data block is not necessarily based only on the basic data blocks of which the operation processing is completed in the nth segmented data block, and may also be based on the basic data blocks of which the operation processing is completed in the previous segmented data blocks, or may be based on both situations.

In some embodiments, the time delay statistical record is the average time for completion of the operation processing of a plurality of previous basic data blocks. For example, in a case that the operation processing of m basic data blocks is completed, the sum of the time for completion of the operation processing of each basic data block in the m basic data blocks is averaged. Here, completion of the operation processing of a single basic data block may be that, assuming that the basic data block is in an area A, the basic data block is sent to an area B (for example, a disk-a storage area) for a read operation or a write operation or a deleting operation or the like, and then returns back to the area A after the operation is ended.

In some embodiments, the step of sequentially merging the basic data blocks, which have not been subjected to the operation processing, in the segmented data blocks within the waiting time period until the waiting time period is ended or the waiting time period is not ended but the merged basic data blocks reach the size of the segmentation unit, and stopping merging includes: in a case that the segmented data block is the first segmented data block, sequentially merging the basic data blocks, which have not been subjected to the operation processing, in the first segmented data block within the waiting time period until the waiting time period is ended, and stopping merging; and in a case that the segmented data block is the nth segmented data block, sequentially merging the basic data blocks, which have not been subjected to the operation processing, in the nth segmented data block within the waiting time period until the waiting time period is ended or the waiting time period is not ended but the merged basic data blocks reach the size of the segmentation unit, and stopping merging, where n is an integer greater than 1. In this embodiment, since the first time delay statistical record is formed by the first or previous several basic data blocks, there must be basic data blocks of which the operation processing is completed in the first segmented data block, such that a situation that the merged basic data blocks reach the size of the segmentation unit may not occur in the first segmented data block, and a situation that the merged basic data blocks reach the size of the segmentation unit may occur in the subsequent segmented data blocks.

In some embodiments, the method further includes: in response to the time delay statistical record being not present in the segmented data block, directly sending all of the basic data blocks in the segmented data block, and performing the operation processing. In this embodiment, in a case that some segmented data blocks have no time delay statistical record, merging processing is unable to be performed, and the basic data blocks thereof are sent in sequence.

In some embodiments, the step of sending the merged basic data blocks and performing the operation processing includes: sending the merged basic data blocks to a storage area corresponding to the segmented data block thereof, and performing the operation processing. In this embodiment, each storage area is established in advance, and then the data is grouped by taking the segmentation unit as the unit. The size of the segmentation unit is the storage capacity of each storage area, and a mapping relationship between each segmented data block and the corresponding storage area is established, such that all of the basic data blocks in each segmented data block are finally sent to the corresponding storage area.

In some embodiments, the method further includes: after obtaining the data which is requested to be subjected to the operation processing, determining whether there is other data, which has the same offset and length as the obtained data, being subjected to the operation processing: in response to the other data being subjected to the operation processing, putting the obtained data in a blocking queue; and in response to no other data being subjected to the operation processing, advancing to the step of grouping the data in sequence by taking a preset segmentation unit as a unit. In this embodiment, the complexity of the merging processing may be reduced by blocking request data with the same offset and length. Generally, a storage system only performs one operation at one moment at a same position, and the system performs resending only when the operation times out, or there is an error. If the system performs a plurality of operations at the same position at a same moment, it may be considered that there are a plurality of clients performing operation at the same time, and in this case, the clients need to determine the consistency of data operations by themselves. Therefore, for the storage system, only one operation at the same position at the same moment needs to be guaranteed to be processed.

Figure 2:
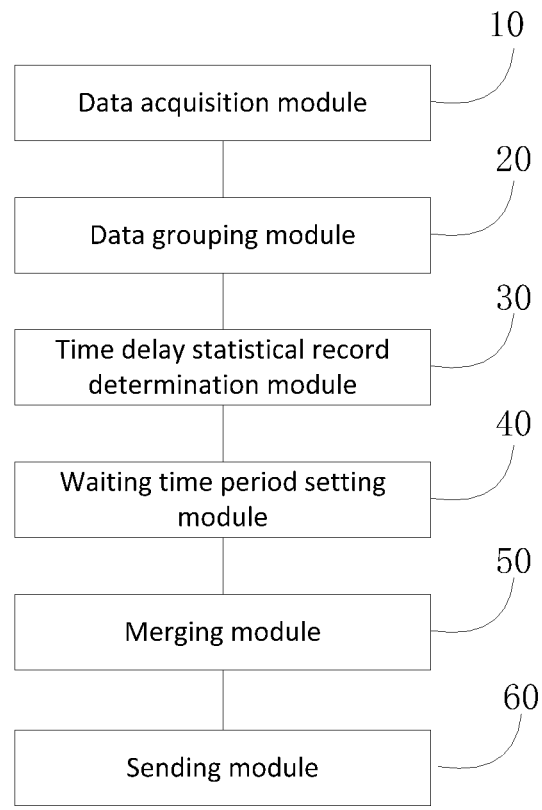
FIG. 2 is a schematic diagram of an embodiment of a data I/O processing apparatus according to the present application.

A second aspect of an embodiment of the present application further provides a data I/O processing apparatus. FIG. 2 shows a schematic diagram of an embodiment of a data I/O processing apparatus according to the present application. The data I/O processing apparatus includes: a data acquisition module 10, which is configured to obtain data which is requested to be subjected to operation processing and consists of a plurality of basic data blocks in sequence; a data grouping module 20, which is configured to group the data in sequence by taking a preset segmentation unit as a unit to obtain a plurality of segmented data blocks in sequence; a time delay statistical record determination module 30, which is configured to sequentially process and determine whether each segmented data block has a time delay statistical record that is based on the time for completion of the operation processing of a previous basic data block; a waiting time period setting module 40, which is configured to, in response to the time delay statistical record being present in the segmented data block, set a waiting time period according to the time delay statistical record: a merging module 50, which is configured to sequentially merge the basic data blocks, which have not been subjected to the operation processing, in the segmented data blocks within the waiting time period until the waiting time period is ended or the waiting time period is not ended but the merged basic data blocks reach the size of the segmentation unit, and stop merging; and a sending module 60, which is configured to send the merged basic data blocks and perform the operation processing.

According to the data I/O processing apparatus in the embodiment of the present application, by means of collecting a time delay statistical record during data I/O, setting a rational waiting time period according to the time delay statistical record, waiting for a period of time before the data is sent, and merging continuous data during the period, the time for data I/O is shortened, such that the throughput of a storage system is further increased, and the performance of the storage system is greatly improved in a continuous data I/O scenario, thereby improving the user experience.

A third aspect of an embodiment of the present application further provides a computer storage medium, having computer program instructions stored thereon, where when the computer program instructions are executed, the method in any one of the above embodiments is implemented.

It should be understood that, without conflict with each other, all the implementations, features and advantages described above for the data I/O processing method according to the present application are also suitable for the data I/O processing apparatus and the storage medium according to the present application. That is to say, all the embodiments applied to the data I/O processing method and variations thereof may be directly transferred and applied to the apparatus and the storage medium according to the present application, and are directly incorporated herein. For the sake of brevity of the present disclosure, details are not described herein again.

A fourth aspect of an embodiment of the present application further provides a computer device, including a memory 302 and a processor 301, where the memory has a computer program stored thereon, and when the computer program is executed by the processor, the method in any one of the above embodiments is implemented.

Figure 3:
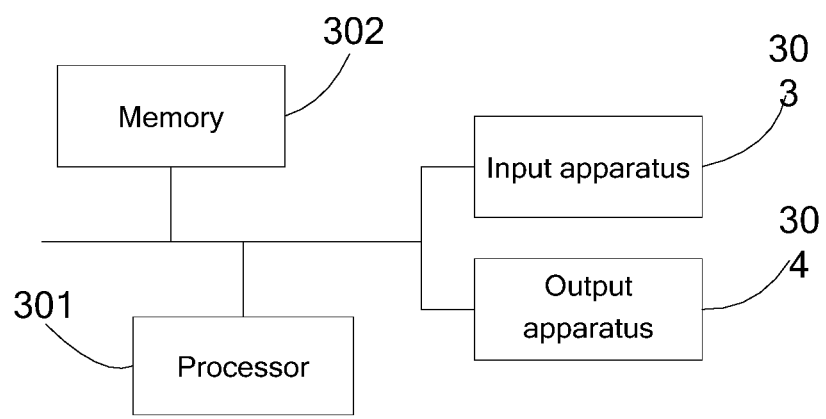
FIG. 3 is a schematic diagram of a hardware structure of an embodiment of a computer device for executing the data I/O processing method according to the present application.

FIG. 3 is a schematic diagram of a hardware structure of an embodiment of a computer device for executing the data I/O processing method according to the present application. By taking the computer device shown in FIG. 3 as an example, the computer device includes a processor 301 and a memory 302, and may further include an input apparatus 303 and an output apparatus 304. The processor 301, the memory 302, the input apparatus 303 and the output apparatus 304 may be connected by a bus or in other manners. In FIG. 3, connection by the bus is used as an example. The input apparatus 303 may be configured to receive input number or character information, and generate a key signal input related to user setting and function control of the data I/O processing apparatus. The output apparatus 304 may include a display device such as a display screen. The processor 301 executes various functional applications and data processing of a server by running non-volatile software programs, instructions and modules stored in the memory 302. That is to say, the processor implements the data I/O processing method in the above method embodiment.

Finally, it should be noted that, the computer-readable storage medium (for example, a memory) herein may be a volatile memory or a non-volatile memory, or may include both the volatile memory and the non-volatile memory. By way of example rather than limitation, the non-volatile memory may include a read-only memory (ROM), a programmable ROM (PROM), an electrically programmable ROM (EPROM), an electrically erasable programmable ROM (EEPROM), or a flash memory. The volatile memory may include a random-access memory (RAM), and the RAM may serve as an external cache memory. By way of example rather than limitation, the RAM is available in various forms such as a synchronous RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), and a direct Rambus RAM (DRRAM). The storage device in the disclosed aspect is intended to include, but is not limited to, these and other suitable types of memories.

Those skilled in the art will also understand that, various exemplary logical blocks, modules, circuits, and algorithm steps described in combination with the disclosure herein may be implemented as electronic hardware, computer software, or a combination of the electronic hardware and the computer software. To clearly describe such interchangeability of hardware and software, various illustrative components, blocks, modules, circuits, and steps have been described generally in terms of their functions. Whether such functions are implemented as software or hardware depends on the specific application and design constraints imposed on the entire system. Those skilled in the art may implement the functions in various ways for each specific application, but such implementation decisions should not be interpreted as causing a departure from the scope disclosed in the embodiments of the present application.

The above are exemplary embodiments of the present application, but it should be noted that, various changes and modifications may be made without departing from the scope disclosed in the embodiments of the present application as defined in the claims. The functions, steps and/or actions of the method claims in accordance with the disclosed embodiments described herein need not be performed in any particular order. In addition, although elements disclosed in the embodiments of the present application may be described or claimed in an individual form, unless explicitly limited to the singular, the plural may also be construed.

It should be understood that, as used herein, a singular form "a" is intended to include a plural form as well, unless the context clearly supports an exception. It should also be understood that, "and/or" as used herein is meant to include any and all possible combinations of one or more of the associated listed items. The serial numbers of the embodiments disclosed in the embodiments of the present application are merely for description, and do not represent the superiority or inferiority of the embodiments.

Those of ordinary skill in the art should understand that, the discussion of any of the above embodiments is merely exemplary, and is not intended to imply that the scope (including the claims) disclosed in the embodiments of the present application is limited to these examples. Under the idea of the embodiments of the present application, the technical features in the above embodiments or different embodiments may also be combined. In addition, there are many other changes in different aspects of the above embodiments of the present application, which are not provided in detail for the sake of brevity. Therefore, any omissions, modifications, equivalent replacements, improvements and the like made within the spirit and principle of the embodiments of the present application shall all fall within the protection scope of the embodiments of the present application.

The invention claimed is:

1. A data I/O processing method, applied by a distributed storage system, comprising the following steps:
    obtaining data which is requested to be subjected to operation processing and consists of a plurality of basic data blocks in sequence;
    grouping the data in sequence by taking a preset segmentation unit as a unit to obtain a plurality of segmented data blocks in sequence;
    sequentially processing and determining whether each segmented data block has a time delay statistical record that is based on the time for completion of the operation processing of a previous basic data block, wherein the time for the completion of the operation processing of the previous basic data block is a time period that a basic data block in a first area of a disk is sent to a second area of the disk for an operation, including a read operation or a write operation or a deleting operation, and then returns back to the first area of the disk after the operation is ended;
    in response to the time delay statistical record being present in the segmented data block, setting a waiting time period according to the time delay statistical record;
    sequentially merging the basic data blocks, which have not been subjected to the operation processing, in the segmented data blocks within the waiting time period until the waiting time period is ended or the waiting time period is not ended but the merged basic data blocks reach the size of the segmentation unit, and stopping merging; and
    sending the merged basic data blocks to a storage area corresponding to the segmented data block thereof, and performing the operation processing, so as to shorten the time for data input and output (I/O), such that the throughput of the distributed storage system is increased;
    wherein each storage area is established in advance, the storage capacity of each storage area is the same as the size of the segmentation unit, and a mapping relationship between each segmented data block and the corresponding storage area is established.

2. The method according to claim 1, wherein the step of sequentially processing and determining whether each segmented data block has a time delay statistical record that is based on the time for completion of the operation processing of a previous basic data block comprises:
    determining whether the first segmented data block has a time delay statistical record that is based on the time for completion of the operation processing of previous several basic data blocks; and
    determining whether the nth segmented data block has a time delay statistical record that is based on the time for completion of the operation processing of basic data blocks in the nth segmented data block and/or in previous n−1 segmented data blocks, wherein n is an integer greater than 1.

3. The method according to claim 1, wherein the time delay statistical record is the average time for completion of the operation processing of a plurality of previous basic data blocks.

4. The method according to claim 1, wherein the step of sequentially merging the basic data blocks, which have not been subjected to the operation processing, in the segmented data blocks within the waiting time period until the waiting time period is ended or the waiting time period is not ended but the merged basic data blocks reach the size of the segmentation unit, and stopping merging comprises:
    in a case that the segmented data block is the first segmented data block, sequentially merging the basic data blocks, which have not been subjected to the operation processing, in the first segmented data block within the waiting time period until the waiting time period is ended, and stopping merging; and
    in a case that the segmented data block is the nth segmented data block, sequentially merging the basic data blocks, which have not been subjected to the operation processing, in the nth segmented data block within the waiting time period until the waiting time period is ended or the waiting time period is not ended but the merged basic data blocks reach the size of the segmentation unit, and stopping merging, wherein n is an integer greater than 1.

5. The method according to claim 1, further comprising:
    in response to the time delay statistical record being not present in the segmented data block, directly sending all of the basic data blocks in the segmented data block, and performing the operation processing.

6. The method according to claim 1, further comprising:
    after obtaining the data which is requested to be subjected to the operation processing, determining whether there is other data, which has the same offset and length as the obtained data, being subjected to the operation processing;
    in response to said other data being subjected to the operation processing, putting the obtained data in a blocking queue; and
    in response to no other data being subjected to the operation processing, advancing to the step of grouping the data in sequence by taking a preset segmentation unit as a unit.

7. A non-transitory computer-readable storage medium, having computer program instructions stored thereon, wherein, when the computer program instructions are executed, the method according to claim 1 is implemented.

8. A computer device, comprising a memory and a processor, wherein the memory has a computer program stored thereon, and when the computer program is executed by the processor, the method according to claim 1 is implemented.

9. The method according to claim 3, wherein said average time is the average of the sum of the time for completion of the operation processing of each basic data block.

10. The method according to claim 6, wherein the complexity of the merging processing is reduced by blocking request data with the same offset and length.

11. The method according to claim 1, wherein a storage system only performs one operation at one moment at a same position, and the system performs resending only when the operation times out or when there is an error.

12. The method according to claim 1, wherein, when segmented data blocks have no time statistical record, the basic data blocks thereof are sent in sequence without merging processing.

13. The method according to claim 1, wherein the segmented data blocks are arranged in sequence according to the sequence of basic data blocks in the data which is requested to be subjected to the operation processing.

14. The method according to claim 13, wherein the first one or several basic data blocks form a first time delay statistical record, and the operation processing of the first one or several basic data blocks is firstly completed.

15. The method according to claim 4, wherein the first segmented data block has basic data blocks of which the operation processing is completed, such that a situation that the merged basic data blocks reach the size of the segmentation unit does not occur in the first segmented data block, and a situation that the merged basic data blocks reach the size of the segmentation unit occurs in subsequent segmented data blocks.

16. The method according to claim 2, wherein the time delay statistical record of the nth segmented data block is obtained based on the basic data blocks of which the operation processing is completed in the nth segmented data block, and/or, in previous segmented data blocks.

\* \* \* \* \*